US010304490B2

(12) United States Patent
Mathur

(10) Patent No.: US 10,304,490 B2
(45) Date of Patent: May 28, 2019

(54) ACOUSTIC HOLOGRAPHIC RECORDING AND REPRODUCTION SYSTEM USING META MATERIAL LAYERS

(71) Applicant: AcoustiX VR Inc., Brooklyn, NY (US)

(72) Inventor: Gopal P. Mathur, Trabuco Canyon, CA (US)

(73) Assignee: ACOUSTIX VR INC., Brooklyn, NY (US)

( * ) Notice: Subject to any disclaimer, the term of this patent is extended or adjusted under 35 U.S.C. 154(b) by 0 days.

(21) Appl. No.: 15/801,942

(22) Filed: Nov. 2, 2017

(65) Prior Publication Data
US 2018/0130491 A1    May 10, 2018

(51) Int. Cl.
*H04R 1/28* (2006.01)
*H04R 5/02* (2006.01)
(Continued)

(52) U.S. Cl.
CPC .. *G11B 20/00992* (2013.01); *G11B 20/10527* (2013.01); *H04R 5/027* (2013.01);
(Continued)

(58) Field of Classification Search
CPC . H04R 5/02; H04R 5/027; H04R 5/04; H04R 17/00; H04S 5/005; H04S 7/307;
(Continued)

(56) References Cited

U.S. PATENT DOCUMENTS

| 5,119,428 A * | 6/1992 | Prinssen | G10K 15/10 |
| | | | 381/63 |
| 2004/0151066 A1 * | 8/2004 | Kim | G03H 3/00 |
| | | | 367/8 |

(Continued)

FOREIGN PATENT DOCUMENTS

WO    WO 2016033916 A1 *   3/2016    ........... G01N 1/24

OTHER PUBLICATIONS

Babaee et al, Reconfigurable Origami inspired acoustic waveguide, Science Journal AAAS, 2016.*
(Continued)

*Primary Examiner* — Davetta W Goins
*Assistant Examiner* — Kuassi A Ganmavo
(74) *Attorney, Agent, or Firm* — Michael J. Feigin, Esq.; Feigin and Fridman

(57) ABSTRACT

Holographic sound is recorded and reproduced by way of a single monaural recording per left and right ear recorded. This is accomplished by determining the phase shift of frequencies recorded after dividing the sound into discrete frequencies in a recording device having resonators, each resonating at a different frequency, placed in a circular arrangement and divided into discrete channels by non-resonant material. The resonators are placed in a pseudo-randomized arrangement within the recording device and the circle of resonators is in front of a microphone which records the sound monaurally. Playback is then by way of arranging speakers or transducers into micro perforated sheets which amplify the sound, the arrangement of speakers/transducers around a central point. The sound is then played back directionally based on the position where the sound originally was recorded from and the position of the particular transducer around the central point.

9 Claims, 10 Drawing Sheets

(51) Int. Cl.
   *G11B 20/10*  (2006.01)
   *H04R 17/00*  (2006.01)
   *G11B 20/00*  (2006.01)
   *H04R 5/027*  (2006.01)
   *H04S 7/00*   (2006.01)
   *H04R 5/04*   (2006.01)
   *H04S 5/00*   (2006.01)

(52) U.S. Cl.
   CPC .... *H04S 7/307* (2013.01); *G11B 2020/10564* (2013.01); *G11B 2020/10601* (2013.01); *H04R 1/2838* (2013.01); *H04R 5/02* (2013.01); *H04R 5/04* (2013.01); *H04R 17/00* (2013.01); *H04R 2201/34* (2013.01); *H04S 5/005* (2013.01); *H04S 2400/15* (2013.01)

(58) Field of Classification Search
   CPC ............... G11C 7/16; G11B 20/00992; G11B 20/10527; G11B 2020/10564; G11B 2020/10601; H01Q 13/10
   See application file for complete search history.

(56) References Cited

U.S. PATENT DOCUMENTS

| | | | | |
|---|---|---|---|---|
| 2008/0136561 | A1* | 6/2008 | Sato | H01G 4/005 333/185 |
| 2008/0226109 | A1* | 9/2008 | Yamakata | G10K 13/00 381/339 |
| 2012/0162732 | A1* | 6/2012 | Hong | G02B 26/0841 359/9 |
| 2015/0288063 | A1* | 10/2015 | Johnson | H01Q 15/0086 342/352 |
| 2018/0040960 | A1* | 2/2018 | Johnson | H01Q 21/005 |

OTHER PUBLICATIONS

Melde et al, Holograms for acoustics Nature, 2016.*
Tsai et al, Single Sensor multispeaker listening with acoustic metamaterials, PNAS, 2015.*
Xie et al, Acoustic Holographic rendering with Two dimensional Metamaterial based passive Phase Array, Scientific Reports, Oct. 2016.*
Bedard et al; Development of a Directivity Controlled piezoelectric transducer for sound reproduction, 2008.*
Casadei et al, Piezo electric resonator arrays for tunable acoustic waveguides and metamaterials, 2012.*
Li et al, Metascreen based acoustic passive phased array, 2015.*
Single-sensor multispeaker listening with acoustic metamaterials, Yangbo Xie, et al, Hong Kong University of Science and Technology, Kowloon, China, Jun. 29, 2015 (available at www.pnas.org/cgi/doi/10.1073/pnas.1502276112 ).

* cited by examiner

ACOUSTIC HOLOGRAPHIC RECORDING AND REPRODUCTION SYSTEM USING META MATERIAL LAYERS

FIELD OF THE DISCLOSED TECHNOLOGY

The present disclosure relates generally to recoding and reproduction of sound, and more specifically, to recording and reproduction of sound holographically.

BACKGROUND OF THE DISCLOSED TECHNOLOGY

Basic audio recording and reproduction technology is omnipresent and has become an integral part of our daily life. These areas cover the full sequence from recording to reproduction in, for example, music recording in studios, concert halls, etc. and subsequent reproduction in home entertainment systems, telephony/office communications, public address systems, etc. The ultimate goal is to reproduce sound exactly as it sounded when first created. In other words, we would like to be in the same acoustic field in which it was originally recorded, in terms of various factors, such as amplitude, frequency content and depth perception, spatial location, etc.

In recent times, steps have been taken towards virtual video/acoustic recording and reproduction in this area. Virtual acoustic recording and reproduction refer to the recording of real-world acoustic concerts/performances in reverberant spaces and their subsequent acceptable reproduction in a virtual version of the original performance space, known as a Virtual Auditory Environment (VAE). Auditory scenes can be created using two main mechanisms: recording or auralization. In the first approach, recording for scene synthesis is usually implemented in a studio environment. For example, in popular music production, a multi-track approach is taken, whereby instruments are layered temporally, spectrally and spatially. Another example is in cinema, where Foley artists create the auditory scene by adding in everyday sounds synchronized to the actor's movements. In the second approach, the creation of auditory scenes through auralization involves the processing of recorded audio (preferably anechoic) with acoustic responses taken in real rooms or computed with auralization software. Unlike virtual reality, which takes us all the way to a new reality, holograms and holographic sound are those which creates some 3-dimensional image in our "own reality". Thus, holography and holographic sound is defined as a technique which enables three-dimensional sound processing by the brain (holograms) to be created such that the brain detects a directional source of the sound and can determine different directions from which the sound emanates, despite, in embodiments of the disclosed technology, two sounds emanating from the same location in space. Accordingly, virtual reality is a reality which has been created via a computer. Augmented reality is virtual reality but with bits added. Holography is a way of showing "pictures" (which includes an audio scene or "picture") in which one can walk around. Although virtual holographic video devices are now widely available, virtual acoustic holographic recording and reproduction devices are still primitive at the time of this writing.

Further describing holography, this is a technique to record and reconstruct the complete information of wave fields. The word 'holo-graph' is derived from the Greek which means whole-drawing—which also describes the vast amount of information contained in a hologram. The basis of holography is spatial storage of the phase and/or amplitude profile of the desired wave-front, in a manner that allows that wave-front to be reconstructed by interference when the hologram is illuminated with a suitable coherent source. Optical holograms have been widely applied in virtual reality displays, data storage, sensing, and security printing.

Acoustic holograms, on the other hand, are relatively less advanced compared to their electromagnetic counterparts in terms of present applications. One major restricting factor is the limited acoustic properties that natural or traditional materials can offer. Acoustic holography is the process in which sound waves are recorded to tangible medium and arranged or reproduced in three dimensions using a processor. The sound field can be modeled to reconstruct its structure using three-dimensional (3D) images. The acoustic hologram could generate 3D sound fields about 100 times more detailed than ones produced by other techniques. To date, most acoustic holographic reconstruction techniques rely on phased arrays with large numbers of active elements, requiring sophisticated phase shifting circuits, large power consumption and careful calibration and tuning. Measuring techniques included in acoustic holography are becoming increasingly popular in various fields. The best-known techniques are based on Near-field Acoustic Holography (NAH). Nearfield-acoustic holography is a method for estimating the sound field near a source by measuring acoustic parameters away from the source by means of an array of pressure and/or particle velocity transducers. Near-field acoustic holography makes it possible to reconstruct the three-dimensional sound field between the source and the measurement plane.

Holographic techniques are fundamental to applications such as volumetric displays, high-density data storage and optical tweezers that require spatial control of intricate optical or acoustic fields, within a three-dimensional volume. A variety of sound field reproduction methods have been proposed such as Ambisonics, Wave Field Synthesis, methods based on the solution of an inverse problem and other techniques. Recently, NAH (Near-field Acoustic Holography) has also been considered for holographic systems. The major advantage of NAH is that it enables reconstruction of all acoustic quantities such as the acoustic pressure, particle velocity and acoustic intensity not only at a measurement location, but in 3D space and on a source surface by measuring the acoustic pressure in the near-field of the target source surface. NAH system includes a spherical array of a plurality of microphones, an analog to digital converter for digitizing pressure data from each microphone, and a processor for determining the acoustic intensity at each location, the processor having computer software adapted to apply a regularization filter to spherical Wave equations for pressure and velocity. Overall, NAH requires a large number of recording and reproducing sensors—as large as 51 microphones and 51 speakers. The need for multiple transducers and system complexity are the major disadvantages of the NAH approach. Furthermore, acoustical holography is still limited by the Nyquist sampling theorem. To avoid spatial aliasing problems, the array microphone spacing must be somewhat less than half of the acoustic wavelength, which sets a serious limitation on the upper frequency. Also, the resulting Nyquist rate is so high that a very high number of samples must be used. The combination of the large amount of hardware (speakers, microphones) and large amount of processing makes such systems cost prohibitive and difficult to implement.

Other simpler methods are limited to biaural sound. Sound is a vibration that propagates as an audible mechanical wave of pressure and displacement through a medium such as air and water. In human hearing terms, sound is the reception of such waves and their perception by the brain. Many theorists earlier believed that only one ear was essential for correct hearing, but it has since been proven that two ears are essential for binaural hearing, and therefore, our understanding of the world around us. In fact, the word "binaural" literally just means "using both ears." The brain's hearing system is binaural, and these methods include relative phase shift for low frequency sounds, relative intensity for sounds in the voice range, and relative time of arrival for sounds having fast rise times and high frequency components. Binaural recording is a method of recording sound that uses two microphones, arranged with the intent to create a 3-D stereo sensation for the listener of actually "being in the room" with the performers or instruments. Binaural sound is usually recorded with two microphones spaced as if they were in place of your ears, sometimes actually in a "Kunstkopf" (dummy head), where the microphones are actually placed where your ear canals would be. The result, when using good headphones for playback, is a realistic sense of the space where the recording was made, and often an uncanny sense of the movement of instruments or voices around that space, even sometimes seeming to come from above or behind you. However, sound reproduction through headphones often leads to 'in-head localization' such that good assessment of spatial cues becomes impossible.

On the other hand, normally mixed and panned multi-microphone studio recordings intended for loudspeaker reproduction often use individual microphones on each instrument and are panned on the mixing console to some location from far left to far right, with voices and often drums placed dead center, and other instruments moved left and right in the artificial image. When listened to such recordings using headphones, the image often seems to be in the middle of your head rather than in the original recording space. There have been various headphone and audio processor designs made to compensate for this "inside the head" perception over the years. It has been observed that while binaural recordings sound their best on headphones, recordings mixed from multiple tracks on studio loudspeakers usually sound their best reproduced on loudspeakers.

Human hearing is three-dimensional. We can distinguish the direction and, to some degree, distance of a sound source. In fact, there's a wealth of information in the sounds that reach our ears, and our brains do some very sophisticated processing of that information. The cochlea, and actually the whole ear, is designed to convert sounds into nerve signals and convey sound information to the brain. The cochlea of the inner ear is the most critical structure in the auditory pathway, for it is there that the energy from acoustically generated pressure waves is transformed into neural impulses. The cochlea not only amplifies sound waves and converts them into neural signals, but it also acts as a mechanical frequency analyzer, decomposing complex acoustical waveforms into simpler elements. The human cochlea is capable of exceptional sound analysis, in terms of both frequency and intensity. The cochlea allows the perception of sounds between 20 Hz and 20000 Hz (nearly 10 octaves), with a resolution of 1/230 octave (from 3 Hz at 1000 Hz). At 1000 Hz, the cochlea encodes acoustic pressures between 0 dB SPL ($2\times10^{-5}$ Pa) and 120 dB SPL (20 Pa).

The cochlea is a hydro-mechanical frequency analyzer located in the inner ear. Its principal role is to perform a real-time spectral decomposition of the acoustic signal in producing a spatial-frequency map. The cochlea uses a frequency-to-space transformation to perform audio spectral analysis. Upon impingement of an acoustic signal onto the fluid-filled cochlea, the basilar membrane undergoes an oscillatory motion at the frequency of the sound, resulting in a wave traveling toward its distal end. The wave is spatially confined along the length of the basilar membrane, and the location of its maximum amplitude is related to the frequency of the sound. The higher the frequency, the more restricted the disturbance to the proximal end. Understanding of frequency analysis in the inner ear progressed through three main periods. The first was dominated by Helmholtz's suggestions that lightly damped, spatially ordered, mechanically resonant elements in the cochlea perform the spectral analysis. The second period, lasting from the late 1940s to the early 1970s was dominated by von Bekesy's description of the traveling wave. The third epoch during which a fundamentally different paradigm has emerged. According to this paradigm, von Bekesy's traveling wave is boosted by a local electromechanical amplification process in which one of the ear's sensory cell groups, outer hair cells, function as both sensors and mechanical feedback elements. This discovery helped to explain the cochlea's frequency selectivity. The differences between Bekesy and Johnston's observations were due to active biological mechanisms that act upon the vibration of the basilar membrane in living subjects.

In the cochlea, the basilar membrane interacts with the fluid, constrained by the shape of the channel, to make a transmission line that supports mechanical traveling waves. Positions along this transmission line correspond to a large number of outputs, with a progression of different frequency responses, analogous to the old Helmholtz resonance view of cochlear function.

For a pure tone sound, active mechanics amplify basilar membrane vibrations by around +50 dB at a very narrow section of the organ of Corti, which serves to increase the sensitivity of the cochlea at this site. Two similar frequencies can therefore activate two distinct cochlear regions, allowing them to be differentiated (a characteristic known as frequency selectivity). This frequency tuning is closely linked to the electro-motility of the outer hair cells (OHCs), and is defined by the fibers of the auditory nerve and the inner hair cells (IHCs) that generate the neural signal.

One of the most significant nonlinear behaviors of the cochlea is high sound-level compression. Sound signals at low intensities are amplified in a frequency-selective manner at certain cochlear position, where the cochlea exhibits large gain, while high-level sound signals are barely amplified, where the cochlea exhibits small gain. The auditory system utilizes a unique method of real-time spectral decomposition along with place theory to attain an impressive auditory range while maintaining real-time processing capabilities. It is able to achieve this by acting as a hydro-mechanical frequency analyzer, as well as using compressive techniques to efficiently transmit data. The inspiring functionality of the basilar membrane is its ability to perform real-time spectral decomposition. Activation of sub-sections of the basilar membrane results in sinusoidal vibrations of varying amplitude and phase, depending on the content of the input signal. Thus, in the inner ear a transformation takes place that maps frequency to location. This mechanism is fundamental for the frequency discrimination of the ear. The location on the basilar membrane for maximal amplitude can be described by:

$$f = 165.4 \; 10^{0.06x} - 1)$$

$$x = \frac{1}{0.06} \log\left(\frac{f + 165.4}{165.4}\right),$$

where:
f: frequency in [Hz]
x: position of maximum excursion of the basilar membrane in [mm].

The frequency-dependent filtering mechanism of the human cochlea system thus takes us to the spatial-frequency dependent design using dispersive acoustic meta material (AMM) systems. As such, the basilar membrane has often been compared to a bank of band-pass filters (BPFs) that simultaneously decompose a convoluted signal into its frequency components. A number of acousticians today think that the most realistic model of basilar membrane function is the resonator system, or, even better, a system of frequency-tuned oscillators that can be regulated by the central nervous system (known as efferent feedback).

Musical audio signals contain a large amount of underlying structure, due to the process through which music is generated. Human hearing is usually very good at analyzing the structure of audio signals, a process known as auditory scene analysis. For music, it is not surprising that a musical audio signal would be generated from a small number of possible notes active at any one time, and hence allow a sparse representation. Compressed sensing (CS) seeks to represent a signal using a number of linear, non-adaptive measurements. Usually the number of measurements is much lower than the number of samples needed if the signal is sampled at the Nyquist rate. CS requires that the signal is sparse in some basis—in the sense that it is a linear combination of a small number of basis functions—in order to correctly reconstruct the original signal. Clearly, the sinusoidally-modeled part of an audio signal is a sparse signal, and it is thus natural to use CS to encode such a signals. Due to its universality and lack of complexity on the sensor side, CS is an attractive compression scheme for multi-sensor systems. Recently, sparseness of audio signal has been exploited with the aim of achieving even higher compression ratio than the current compression techniques used in the multimedia coding standards.

It is known that an impedance-matched surface has the property that incident wave generates no reflection. A perfect acoustic absorber of deep-subwavelength scale is of great scientific and engineering interest. It can act as the exact time-reversed counterpart of a point source, with important implications for time-reversal wave technology. Traditional means of acoustic absorption make use of porous and fibrous materials and gradient index materials, or employ perforated or micro-perforated panels with tuned cavity depth behind the panels. They generally result in either imperfect impedance matching to the incoming wave, or very bulky structures with dimensions comparable to the wavelength. Active 'absorbers', on the other hand, require costly and sophisticated electrical designs. Recently, it was shown that, for electromagnetic waves, structuring the interface between two different materials can lead to meta surfaces with diverse functionalities such as phase discontinuity, anomalous refraction/reflection, and polarization manipulation. Acoustic meta material based systems not only can record with fewer sensors but reproduce the sound with less speakers. By exploiting acoustic meta materials and compressive sensing, a holographic recording device with fewer sensors that separates simultaneous overlapping sounds from different sources and a speaker array which can reproduce the holographic sound, a complete virtual acoustic holographic system is designed and presented. Anisotropic acoustic meta materials can be designed to have strong wave compression effect that renders direct amplification of pressure fields in meta materials.

Thus, what is needed is a way to accurately reproduce holographic sound which is less expensive and better quality than what is currently known in the art.

SUMMARY OF THE DISCLOSED TECHNOLOGY

A method of recording and reproducing sound holographically or in three dimensions, and devices to carry out same, are disclosed herein. Three dimensional sound recording and playback or holographic sound is defined as sound for which a healthy human brain can detect the direction from which the sound emanated from, as well as differentiate from a direction from which another sound emanated from in any direction around a 360 degree plane. This is accomplished in embodiments of the disclosed technology by receiving sound into a microphone after the sound has been reflected and/or refracted off a plurality of resonators arranged into discrete channels. Resonators in embodiments of the disclosed technology are acoustic resonators which vibrate and amplify a specific frequency. The "specific frequency" can be within 1 Hertz (Hz), 5 Hz, 10 Hz, or 20 Hz depending on the embodiment. At the exact frequency of resonance, a specific resonator will resonate most strongly compared to other frequencies.

The sound outputted by the microphone (that is, the sound waves received by the microphone which are produced by vibration of the resonators) is recorded after applying a digital compression scheme to the sound. The digital compression scheme is described in the detailed description, below.

Based, at least in part, on a distance between each of the discrete channels to the microphone and a determined phase shift of at least some frequencies within the sound (due to (known) distance from a respective resonator to the microphone), a plurality of piezo-drivers are vibrated. Piezo-drivers are devices which convert electrical impulses to mechanical impulses or vibrations. These piezo-drivers send vibrations through acoustic metamaterial in a manner which at least partially recreates directionality of the sound reflected or refracted off the plurality of resonators. The piezo-drivers and associated metamaterial is placed equidistant from a center point such that a direction of the sound can be reproduced by producing the sound in a correct direction around the center point, though the shape of the device on which the metamaterial is arranged can be hexagonal, octagonal, and so forth (e.g. 10, 12, 14, 16, sided).

The microphone used to record the sound can be monaural and omni-directional and calibrated to receive sound substantially equally from each of the discrete channels. Each resonator resonates at a different frequency than each other resonator and are pseudo-randomly arranged in a circular arrangement in front of a sound input end of the microphone. In other words, the microphone is pointed in a first direction and the circular arrangement of the resonators is in front of the direction in which the microphone points, centered around, in some embodiments, an imaginary line extending from the tip of the microphone outwards past the front of the microphone. The pseudo-randomly arranged resonators are arranged in discrete channels in a circular manner, the discrete channels being separated from one another by non-resonant material there-between each two channels of the discrete channels. In other words, the resonators between each layer of non-resonant material make up a single channel. There is, around a circular or regular polygonally cross-sectioned shape, an alternation between resonators and non-resonant material with a plurality of resonators each designed to resonate at a different frequency, between each layer of non-resonant material.

In embodiments of the disclosed technology, based on the distance between each discrete channel and the microphone as well as the determined phase shift, a direction from which the sound emanated is determined. This determination is then used to cause the plurality of piezo-drivers to vibrate the acoustic metamaterial. The correct piezo-driver, based on it's position around the output/playback device is vibrated as a result so that the sound is outputted in the correct orientation in three dimensional space. It should be understood that this can also occur with the sound being emanated from multiple piezo-drivers though the volume (as a result of amplitude of vibration of the piezo-driver) of each will then correspond to the volume from each direction where the sound emanated. Likewise, when the sound emanated from a location in three dimensional space between two the position of two metamaterial plates used for output, then each can be vibrated a lesser amount to recreate the sound from a direction between and so forth.

The plurality of piezo-drivers are equi-spaced around a center point on a sound reproduction device in manner lacking correspondence with placement of the plurality of resonators, in some embodiments. That is, there can be, for example, 32 discrete channels used in the recording device but only a 12-sided playback device, a 15-sided playback device or the like. These plurality of piezo-drivers are each attached to a single sound reproduction device which amplifies sound waves emanating from said plurality of piezo-drivers in some embodiments.

The above is described with reference to a single monaural recording at a single location using a single microphone. This can also be carried out using two sets of devices as described above. This is akin to using one recording device and one playback device for each ear, or what is known in the art as recording and playback of stereo sound. Thus, in such an embodiment, one would use two microphones, sound reflected or refracted off a plurality of resonators each of the plurality corresponding to one of the two microphones (and placed in front of a respective microphone in the circular arrangement). For each of the two microphones, after applying a digital compression scheme (such as the twist algorithm known in the art) to the output therefrom, the data is stored and playback proceeds (at the same time or a later time, upon retrieval of the stored data) as described in the above embodiment. Now, each playback device can be placed closer to a respective ear of a person forming left and right audio, each producing holographic sound for each left and right audio.

In the above embodiment, each microphone can be monaural and omni-directional and calibrated to receive sound substantially equally from each resonator of a specific plurality of resonators corresponding to a respective one of the two microphones. So too, in the playback device, there are a first set of piezo-drivers equi-spaced from a center point and a second set of piezo-drivers equi-spaced from a second center point on the sound reproduction device in some such embodiments. Each first set and second set outputs recreate sound from a different one of the two microphones.

Said another way, a plurality of resonators, each of which resonates at a different frequency, are arranged in a substantially circular arrangement. A microphone is situated between the plurality of resonators on at least one plane of a three dimension plane. A tangible storage medium stores a digital and compressed version of output from the microphone. A plurality of piezo-drivers arranged equi-distant from a center point on a sound reproduction device play back an uncompressed version of the output from the microphone with output to specific piezo-drivers of the plurality of piezo-drivers based on a determined phase shift of at least some frequencies within the output of the sound (or input of the sound, recorded sound, and the like).

A directionality of sound recorded by said microphone is reproduced by the piezo-drivers which cause vibrations through acoustic metamaterial layers attached to the sound reproduction device. An additional and substantially identical set of a plurality of resonators, the microphone, and the plurality of piezo-drivers can be used to create sound together with the first set to produce binaural and/or stereo sound. Playback by the plurality of piezo-drivers and additional plurality of piezo-drivers allows for detection of a position of sound picked up by the microphone and the additional microphone to be aurally determined in three-dimensional space relative to the plurality of piezo-drivers and the additional piezo-drivers.

The plurality of piezo-drivers are each attached to a single sound reproduction device which amplifies sound of the piezo-drivers in embodiments of the disclosed technology. Spacing of the piezo-drivers (relative to each other) has no correspondence with spacing of the plurality of resonators/discrete channels (relative to each other) in embodiments of the disclosed technology. The plurality of resonators are pseudo-randomly arranged in the substantially circular arrangement in embodiments of the disclosed technology. The plurality of resonators are bifurcated by a plurality of equi-spaced non-resonant material arranged within the circular arrangement in embodiments of the disclosed technology. Each or the sole microphone used is monaural and the storage medium stores sound received therefrom in a single channel of data, compressed, in embodiments of the disclosed technology.

"Substantially" and "substantially shown," for purposes of this specification, are defined as "at least 90%," or as otherwise indicated. Any device may "comprise" or "consist of" the devices mentioned there-in, as limited by the claims.

It should be understood that the use of "and/or" is defined inclusively such that the term "a and/or b" should be read to include the sets: "a and b," "a or b," "a," "b."

DETAILED DESCRIPTION OF EMBODIMENTS OF THE DISCLOSED TECHNOLOGY

Figure 1:
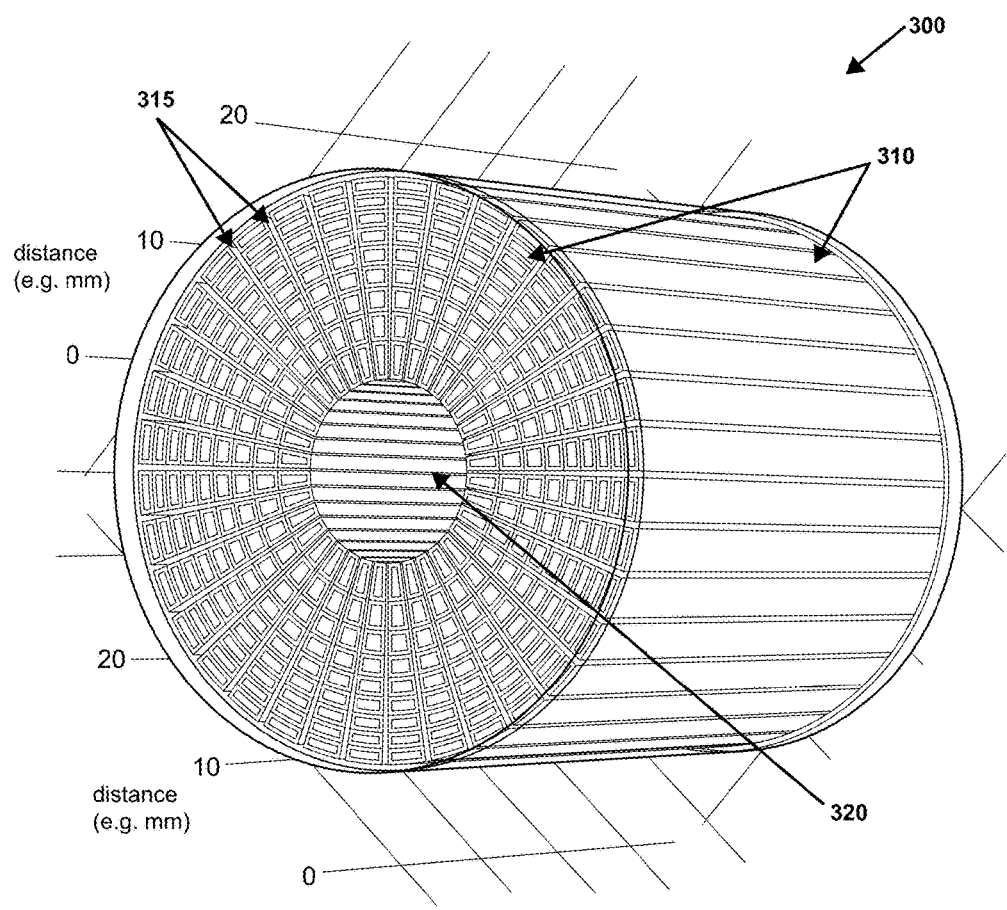
FIG. 1 shows a perspective view of a monaural recording device used in embodiments of the disclosed technology.

Holographic sound is recorded and reproduced by way of a single monaural recording per left and right ear recorded. This is accomplished by determining the phase shift of frequencies recorded after dividing the sound into discrete frequencies in a recording device having resonators, each resonating at a different frequency, placed in a circular arrangement and divided into discrete channels by non-resonant material. The resonators are placed in a pseudo-randomized arrangement within the recording device and the circle of resonators is in front of a microphone which records the sound monaurally. To achieve stereo recording, two such circular arrangements of resonators each associated with a single monaural microphone are used. Playback is then by way of arranging speakers or transducers into micro perforated sheets which amplify the sound, the arrangement of speakers/transducers around a central point. The sound is then played back directionally based on the position where the sound originally was recorded from and the position of the particular transducer around the central point.

To understand embodiments of the disclosed technology, it is necessary to explain the discoveries about the human ear and recording which have been made by the inventor.

The human ear cochlea can be viewed as a chain of globally forced coupled oscillators, and this model incorporates fundamental aspects of both the resonance and traveling wave theories. The spectrum-analysis architecture used by the biological cochlea is extremely efficient: analysis time, power and hardware usage all scale linearly with, the number of output frequency bins, versus N log(N) for the Fast Fourier Transform. A graded bank of uncoupled harmonic oscillators with cochlear-like frequencies and quality factors is simultaneously excited, and that resonances gives rise to similar frequency responses, group delays, and traveling wave velocities as observed by experiment. A tone produces global, near-simultaneous forcing in a graded bank of coupled resonators and this causes an apparent traveling wave. The band-pass filter mechanism is simulated by a bank of randomized Helmholtz resonators or subwavelength resonators in the present patent.

Acoustic meta materials (AMM) (defined as "a device used to absorb sound and reduce sound intensity comprised of, or consisting of, a thin flat plate less than, or equal to, 2 mm thick, with at least one hole or a series of spaced-apart holes.") combine geometrically placed spacing and resonance effects. For example, a conventional base material is modified so as to have a regular structure containing holes, channels, resonators or scattering sites leading to a material exhibiting negative effective density ($\rho_{eff}$) and bulk modulus ($K_{eff}$), whereas normally they are both positive, resulting in a negative acoustic refractive index (($\eta_{eff}$<1). A simple AMM resonator is Helmholtz resonator used extensively in various applications. Helmholtz resonator, a well known acoustic resonator, which is small compared to the wavelength while presenting relatively low losses due to viscous damping. The latter consists of a rigid container embedding a volume V, terminated by an open-ended neck of length l and cross section S. An acoustically reflecting surface can be designed to acquire hybrid resonances which becomes impedance-matched to airborne sound at tunable frequencies, such that no reflection is generated. The Helmholtz resonator shown here is used as a baseline conventional element to explain the AMM concept. When compared to a single resonator, a duct with several identical resonators exhibits a unique attenuation characteristic caused by structural periodicity, and may, if carefully designed, provide a much broader noise attenuation bands. This behavior of multiple resonators alludes to Bloch (i.e., Bragg) wave phenomena which is also known as phononic crystal behavior. It may be mentioned that phononic crystals are a sub-class of acoustic meta-materials. A Helmholtz resonator used as acoustic resonator or scatterer can be tuned to a single design frequencies with side band gaps introduced due to Bloch waves.

Since the resonant frequency of a unit depends only on its inertia (for example, the mass) and the restoring force (for example, that of the spring), the relevant wavelength at the resonant frequency can be orders of magnitude larger than the physical dimension of the resonant unit. This sub-wavelength characteristic is therefore a common feature of all types of meta materials, which also includes sub-wavelength structures with functionalities not found in nature. The meta material properties are independent of the material used and are dependent only on the geometry of the structure and the medium that fills it. Therefore these structures are ideal for the realization of tunable negative bulk modulus. Sub-wavelength control of acoustic waves has not been studied as much as in electromagnetic, but there have been few attempts in order to realize super-resolution imaging based on canalization or hyperlens.

Compressed sensing (also known as compressive sensing, compressive sampling, or sparse sampling) is a signal processing technique for efficient acquisition and reconstruction of a signal, by finding solutions to underdetermined linear systems. This is based on the principle that, through optimization, the sparsity of a signal can be exploited to recover it from far fewer samples than required by the Shannon-Nyquist sampling theorem. There are two conditions under which recovery is possible. The first one is sparsity which requires the signal to be sparse in some domain. The second one is incoherence which is applied through the isometric property which is sufficient for sparse signals. Compressed sensing is advantageous whenever signals are sparse in a known basis; measurements (or computation at the sensor end) are expensive; but computations at the receiver end are cheap. Being able to recover images from incomplete data is very important: less time spent on imaging or other sensing technologies, relieves storage requirement, because only incomplete data is needed to recover all that we need and conserves energy. The signal of interest is sampled by taking small number of linear random projections of the signal which contain most of the vital information about the signal. It basically relies on two major assumptions about the signal i.e. sparsity and incoherence. Sparsity depends upon the signal of interest and incoherence depends upon the sensing modality. Sparsity means that the amount of information present in the signal is much less than the total bandwidth acquired by the signal. Most of the natural signals are sparse in nature. On the other hand, incoherence means that, signals that can be represented sparsely should be spread out in the domain in which they are acquired. It is interesting to note that sparsity lives in audio signals, radar, statistical models, PDE solutions and much more.

Acoustic meta materials are artificially fabricated materials designed to control, direct, and manipulate sound waves. Since the acoustic meta materials are one of the branch of the meta materials, the basic principle of the acoustic meta materials is similar to the principle of meta materials. These meta materials usually gain their properties from structure rather than composition, using the inclusion of small inhomogeneities to enact effective macroscopic behavior. Control of the various forms of sound waves is mostly accomplished through the bulk modulus $K_{eff}$, mass density $\rho_{eff}$, and chirality. Acoustic meta materials can be generally divided into two main areas. Resonant materials usually consist of a matrix material in which is embedded periodic arrangements of inhomogeneities such as resonators, rigid spheres or cylinders with spacing less than a wave-length. The embedded structures cause wave scattering and resonant behavior which creates stop bands and refraction effects. Non-resonant acoustic meta materials are designed to control the propagation of acoustic waves through fluids and materials. Both resonant and non-resonant meta material designs are used in the present patent. An acoustically reflecting surface can acquire hybrid resonances and becomes impedance-matched to airborne sound at tunable frequencies, such that no reflection is generated. Each resonant cell of the meta surface is deep-subwavelength in all its spatial dimensions, with its thickness less than the peak absorption wavelength by two orders of magnitude. As there can be no transmission, the impedance-matched acoustic wave is hence either completely absorbed at one or multiple frequencies, or converted into other form(s) of energy, such as an electrical current.

Acoustic signals, such as, speech, music, etc. are information rich signals which has become the primary means of communication among humans. Digitizing real world signals helps to achieve more compact representations and provides better utilization of available resources. Also, inverse problems abound in many application areas of signal/image processing: remote sensing, radar imaging, tomographic imaging, microscopic imaging, astronomic imaging, digital photography, etc. Image restoration is one of the earliest and most classical linear inverse problems in imaging, dating back to the 1960s. Signal processing theory states that the rate at which signals must be sampled in order to capture all of the information of that signal is equal to twice the Fourier bandwidth of the signal (Nyquist rate). This sampling method produces a large amount of data with a large amount of redundant information. Traditionally, to recover a signal, enough samples need to be taken to avoid aliasing and reconstruct with good accuracy. The Nyquist-Shannon sampling theorem states that to restore a signal exactly and uniquely, you need to have sampled the signal with at least twice its frequency. Of course, this theory is still valid; if you skip one byte in a signal or image of white noise, you can't restore the original. But most interesting signals and images are not white noise. When represented in terms of appropriate, basis functions, such as trigonometric functions or wavelets, many signals have relatively few non-zero coefficients. In compressed (or compressive) sensing terminology, they are sparse. Shannon's theorem (also called the Shannon-Nyquist sampling theorem) then says that the resolution of an image is proportional to the number of measurements. If you want to double the resolution, number of pixels needs to be doubled.

With compressive sensing, the Nyquist criteria can be violated, as long as certain conditions such as signal sparsity and incoherence can be used to compensate for the limited measurements and, thus, still recover the signal accurately. It has been observed that many important signals have this property of sparseness, thus allowing the number of samples required to capture all of the signal's information to be reduced. A signal is called sparse in nature if it has only a few significant (large in magnitude) components and a greater number of insignificant (close to zero) components.

In compressive sensing or sampling (CS) signal sparseness allows signals to be under sampled without the loss of information. CS is defined as a signal processing technique for efficiently acquiring and reconstructing a signal, by finding solutions to under-determined linear systems. This is based on the principle that, through optimization, the sparsity of a signal can be exploited to recover it from far fewer samples than required by the Shannon-Nyquist sampling theorem. There are two conditions under which recovery is possible. The first one is sparsity which requires the signal to be sparse in some domain. The second one is incoherence which is applied through the isometric property which is sufficient for sparse signals. In the compressed-sensing view of the world, the achievable resolution is controlled primarily by the information content of the image. A signal is said to be compressible if it is sparse in nature. An image with low information content can be reconstructed perfectly from a small number of measurements. Once the requisite number of measurements have been made, it doesn't help to add more.

Compressive sensing is a technique in signal processing that allows for accurate reconstruction of sparse signals given a limited number of measurements and an under-determined linear system. However compressive sensing shows that this rule does not need to hold if we know that the signal is sparse, and the system is incoherent, which means that the system should be able to spread out the sparse signal in the measurement. When the system is coherent, or fails to spread out the original signal appropriately, this technique fails. Since sparsity is the main principle behind CS, effective sparse representations of signals play a major role in the success of CS based applications. Compressed sensing (CS) technology, for example, has recently shown that tomographic images can be well retrieved from far less sample data than the Shannon-Nyquist criterion.

"Ground truth" involves the collection of measurements and observations about the type, size, condition and any other physical or spectral properties believed to be of importance concerning the acoustic sources and frequency content that are being sensed. CS comprises a collection of methods of representing a signal on the basis of a limited number of measurements and then recovering the signal from these measurements.

The signal to be acquired may be represented as follows:

$$s = \psi x,$$

where s is signal to be acquired, $\psi$ is sparsifying matrix and x is real valued column vector.

$$y = \phi s = \psi \phi x,$$
$$= Ax = A_k \cdot x_k$$

where y is compressed samples and $\phi$ is sensing matrix. The solution to above equation is:

$$X_k = \begin{pmatrix} A_k^T A_k \\ \square^{-1} A_k^T y \end{pmatrix}$$

Above is an under-determined problem i.e. projection of an n-dimensional vector into an M dimensional space i.e. Number of equations<Number of Unknowns.

To solve this kind of problems, the concept of Norms is used. Norms assign strictly positive length to vectors in a vector space. Norms are of following types:

a. L0 Norm: It simply counts the number of non-zero components in a vector b. L1 Norm: It is given by the following equation:

$$\|x\|_1 = \sum_{i=1}^{N} |x_i|$$

$L_2$ Norm: It is given by following equation:

$$\|x\|_2 = \left(\sum_{i=1}^{N} |x_i|^2\right)^{\frac{1}{2}}$$

The resonant behavior of a Helmholtz resonator is due to the oscillation of the mass of the gas column located in the neck, while the cavity behaves as the restoring force of the harmonic oscillator. The resonant frequency of the Helmholtz resonator may therefore be simply written as:

$$f = \frac{c}{2\pi}\sqrt{\frac{S}{Vl}}$$

The resonance frequency can occur in the low frequency range where the operating wavelength is much larger than the resonator dimension. By selecting the resonance frequencies properly, it is possible to simultaneously achieve negative density and negative compressibility over a finite range of frequencies. A system of independent resonators can produce traveling wave with zero transfer of energy in the direction of the travel.

In Helmholtz resonators, the effective bulk modulus, rather than the effective mass density, becomes frequency-dependent. The resonance-induced anomalous effective bulk modulus $K_{\textit{eff}}$ can be achieved by a waveguide shunted by a chain of Helmholtz resonators. Helmholtz resonance is characterized by the oscillation of the fluid in the neck section under the restoring force provided by the compression and expansion of the fluid in the cavity. The sample is sub-wavelength in its dimension. Negative bulk modulus, caused by the frequency dispersion of the local resonances, is obtained. The hidden source for a Helmholtz-resonator-based meta material is the extra air volume injected from the resonator cavity. An AMM meta surface with sub-wavelength scale unit cells that is impedance-matched to airborne sound at tunable frequencies is achieved by coupling different resonators and generating a hybrid resonance mode.

Designing a Sensing Matrix: Following conditions need to be strictly satisfied while designing a sensing matrix so that, the signal is recovered faithfully:

Universal Incoherence condition: The value of cross correlation between two channels or column vectors of a sensing matrix must be minimum.

Data Independence: The construction of a random matrix does not depend upon any prior knowledge of data.

Robustness: Transmission of randomly projected coefficients is robust to packet loss in the network.

Incoherence condition: The sensing matrix should be as different from the sparsifying matrix. Time and frequency basis are maximally incoherent. Following equation signifies the incoherence condition:

$$\mu < 1/(2K-1)$$

Embodiments of the disclosed technology will become clearer in view of the following description of the figures.

Figure 2:
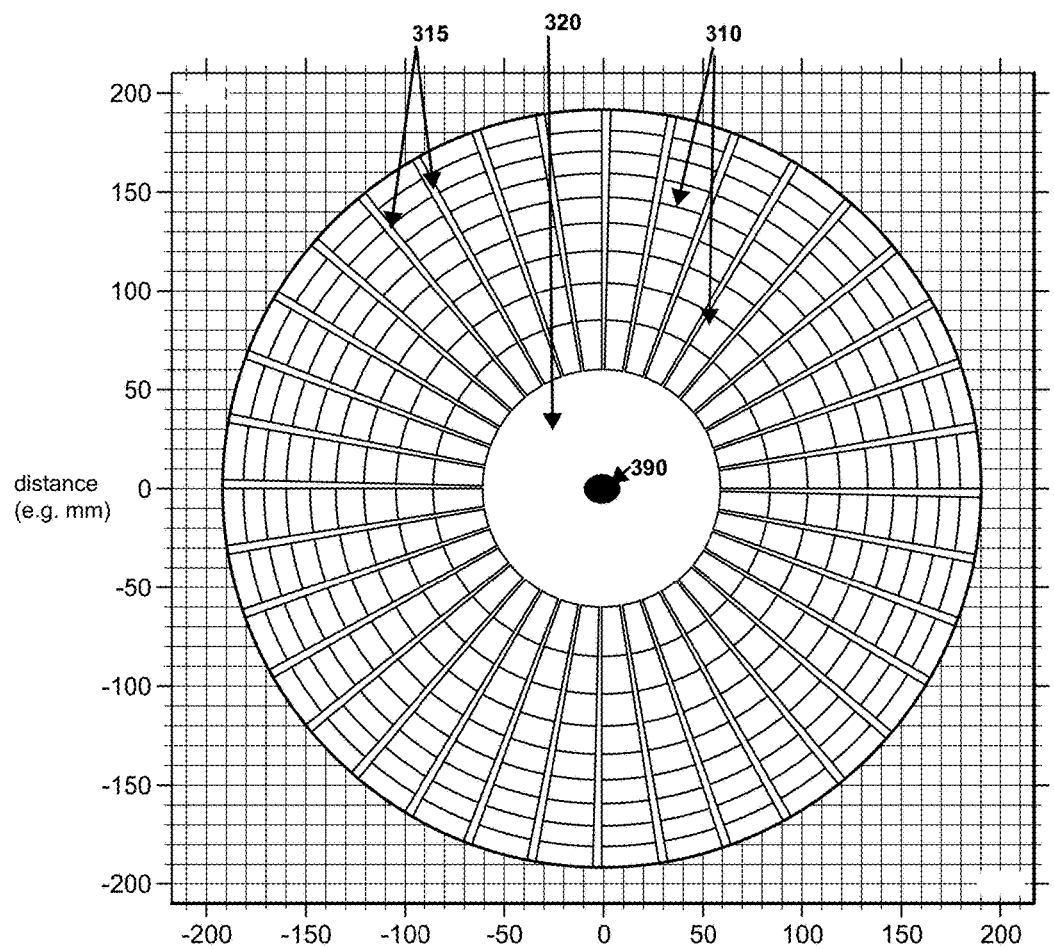
FIG. 2 shows a plan view of a monaural recording device used in embodiments of the disclosed technology.
Figure 3:
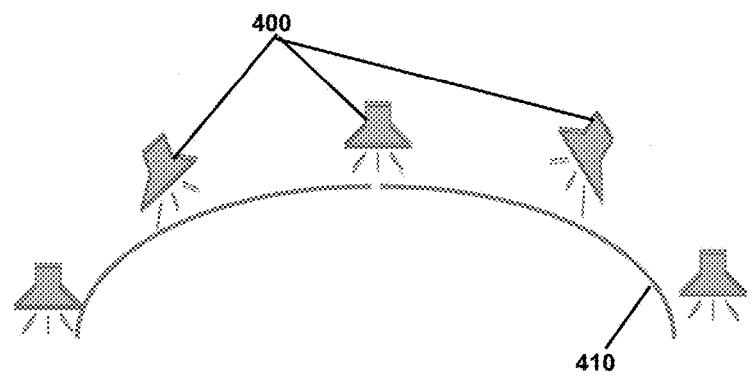
FIG. 3 shows a high level diagram of a sound acquisition or recording device used in embodiments of the disclosed technology.
Figure 3:
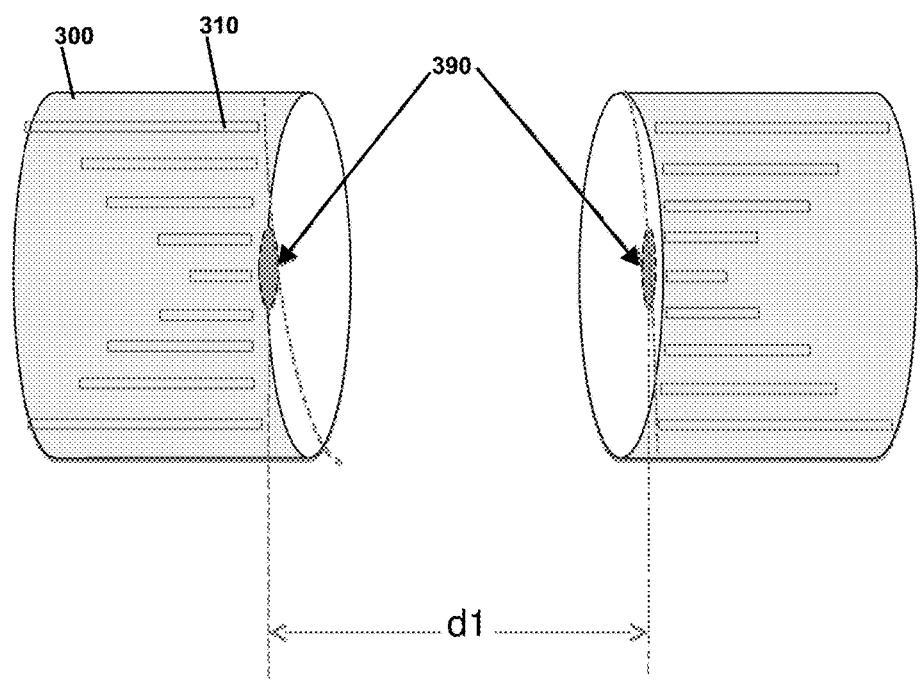

Referring first to FIGS. 1-3, these figures show a sound acquisition system using acoustic meta material layers forming resonators and non-acoustic separation barriers separating groups of resonators into discrete channels. The exterior shape of the sound acquisition device can be spherical, conical, or formed from a regular polygon extended in three dimensional space. The distances given (non-bold numbers) in FIGS. 1 and 2 are in millimeters showing the size of the sound recording or acquisition system in a particular embodiment. It should be understood that the size can vary and the sizes given are for exemplary purposes only.

Figure 4:
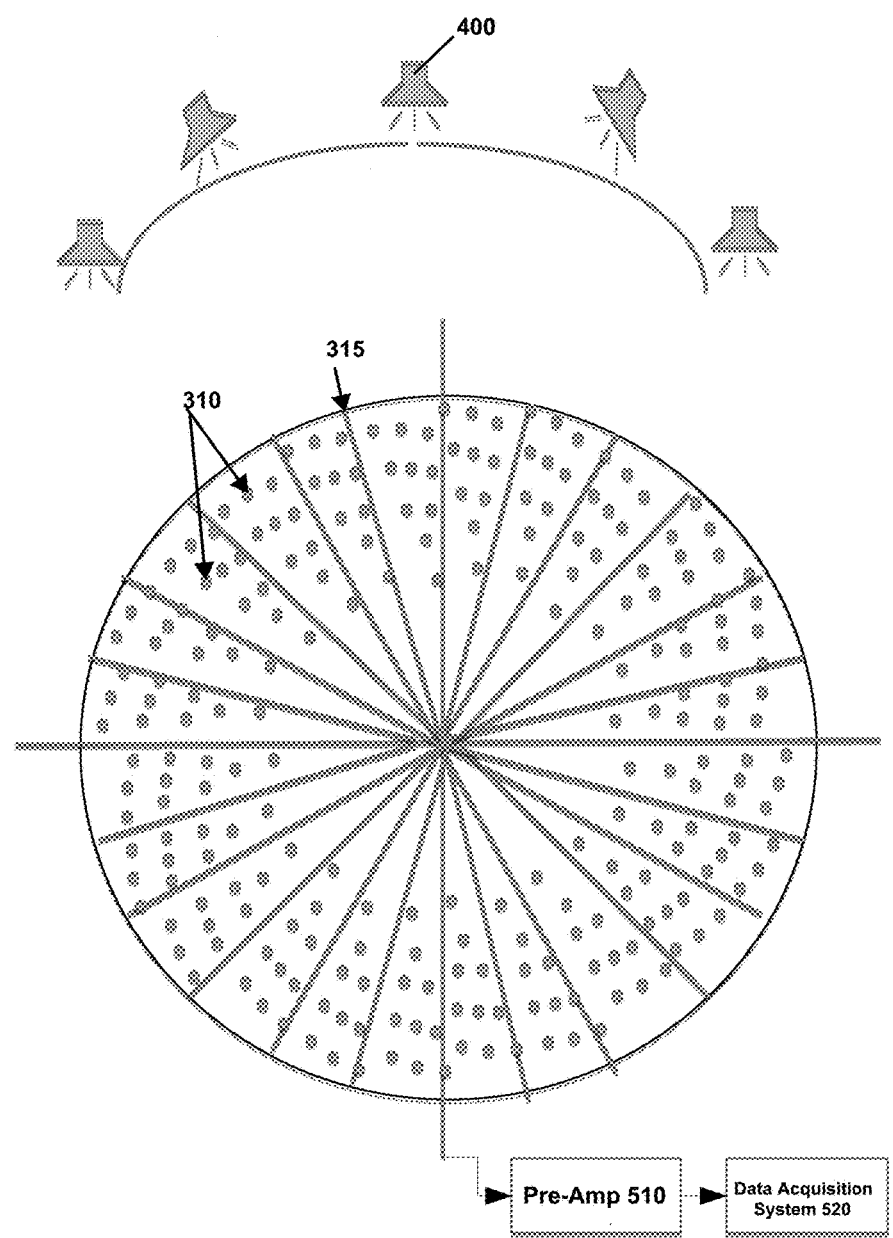
FIG. 4 shows a cross section of the sound acquisition or recording device of FIG. 3 turned 90 degrees relative to FIG. 3.

Referring first to FIGS. 3 and 4, FIG. 3 shows a high level diagram of a sound acquisition or recording device used in embodiments of the disclosed technology. FIG. 4 shows a cross section of the sound acquisition or recording device of FIG. 3 turned 90 degrees relative to FIG. 3. Two such devices 300 each form one monaural recording device, such as for left and right sides. Each comprises a plurality of acoustic resonators 310, each resonator resonating at specific discrete frequencies and surrounding a (monaural and omni-directional, in some embodiments) microphone 390. The left half of the system records sound for the left recording/sound representing a left ear and the right half for the right recording/sound (i.e., right ear). The distance d1 between the centers of two recording devices 300 can be set to binaural or stereo recording requirements. The distance d1 for binaural can be the distance between the ears the intended listened (about 21.5 cm). The distance d1 for stereo recording and playback via two playback devices can be between about 1 meters and 25 meters, by way of example. Each AMM recording system has several channels, defined by the resonators 210 placed between each layer of non-resonant material 315. Each channel comprises resonators with randomized resonances and a recording microphone at the center of the system. After the sound is received by the microphone 390, it is sent to, in some embodiments, a pre-amplification device 410 which amplifies the sound and then a data acquisition system 520 which manipulates the data and stores the data to a tangible storage medium.

Embodiments of the disclosed technology will become more clear in view of the following discussion of the figures.

FIG. 1 shows a perspective view of a monaural recording device used in embodiments of the disclosed technology. As described above, in embodiments two such monaural recording devices 300 are used. Each device 300 has a plurality of Helmholtz/acoustic sub-wavelength resonators of varying volumes (relative sizes to each other). Some are larger and some are smaller in order to vary at different frequencies, each. The resonators 310 are placed randomly or pseudo-randomly in position around a center point of the device 300 to provide maximum resonant dispersion. A face plate over the resonators has a specific percent open area (POA), thickness and hole diameter which covers the resonators in each sound acquisition device 300 to provide acoustic impedance matching for incoming acoustic signals. Similar randomized dispersion in resonator channels can also be achieved by varying hole diameter and keeping the volume (size) of resonators constant, as better described when viewing FIG. 2.

FIG. 2 shows a plan view of a monaural recording device used in embodiments of the disclosed technology. The resonating dispersion of each channel (resonators between non-resonant layers 315 which acoustically separate a group of resonators 310 from one another into the discrete channels) has a plurality of Helmholtz (acoustic) resonators distributed into channels separated by layers 315. The resonances are randomized or pseudo-randomized and contribute to a measurement matrix that supports compressive sensing, as described above. The randomized modulation from all of the channels "scrambles" the original omni-directional measurement modes of the single sensor which an omni-directional microphone 390 in embodiments of the disclosed technology, placed in the center of a ring of resonators 310 and channels. As a result, the measurement modes are complex in both the spatial and spectral dimensions.

Figure 9:
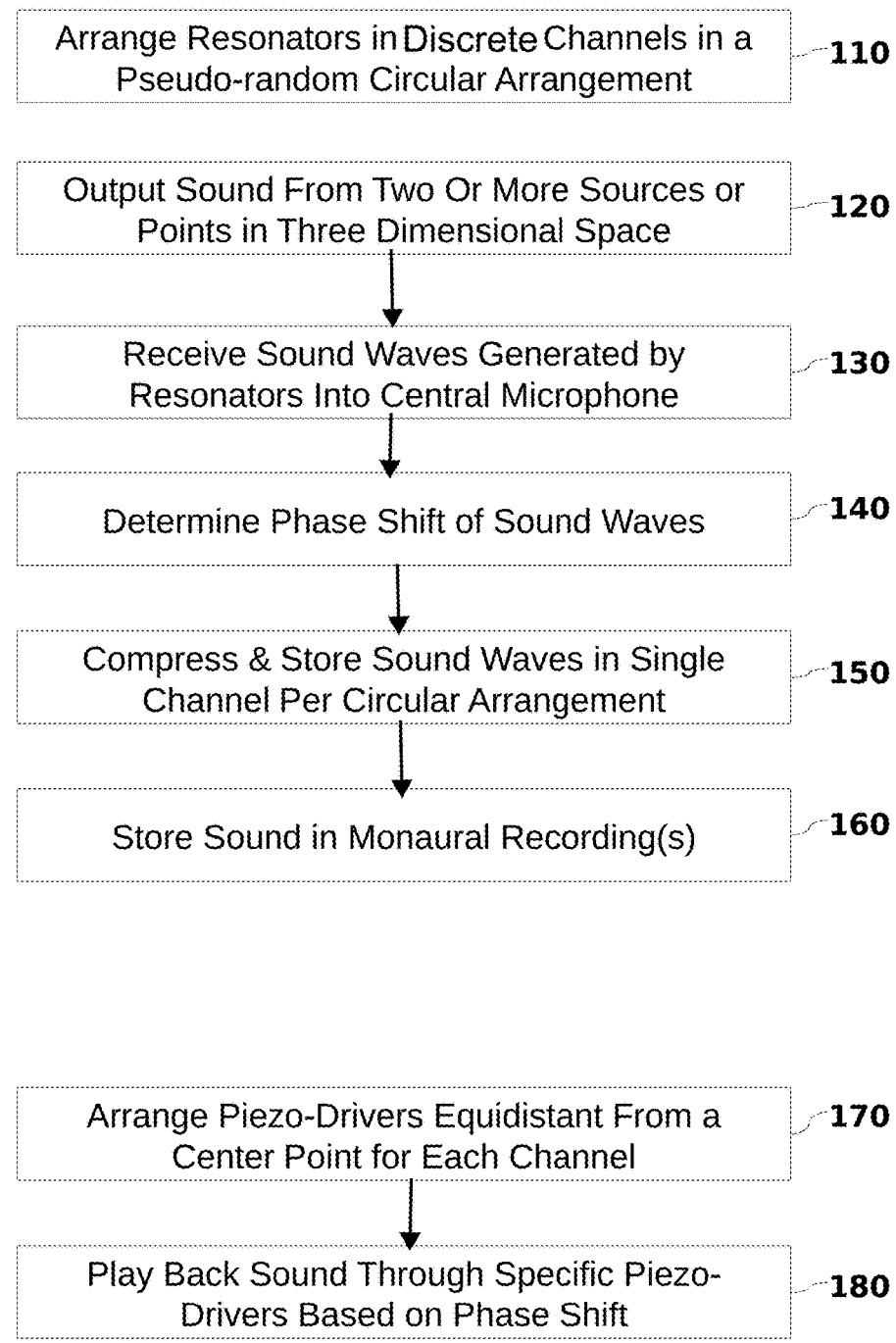
FIG. 9 shows a high level block diagram of measuring and reconstructing holographic waves.

Skipping now to FIG. 9, FIG. 9 shows a high level block diagram of measuring and reconstructing holographic waves. Assuming the resonances in each channel (the group of resonators 310 between each non-resonant section 315) are distributed sparsely over the frequency range of interest and only first-order filtering responses dominate, the overall frequency modulation of a waveguide can be approximated by the multiplication of the individual responses of the resonators:

$$T_i(\omega) = \Pi_j T_{ij}(\omega)$$

For a source located at $r'_k$, frequency response can be derived by propagating the waveguide responses from each waveguide aperture $\vec{r}_i$ to the source location $\vec{r}_k$:

$$G(\omega, \vec{r}_i, \vec{r}_k)T_i(\omega)R(\omega, \vec{r}_i, \vec{r}_k)$$

$$P_c(\omega, \vec{r}_k, S_0) = a(\omega)S_0(\omega)\sum_{i=1}^{N}[\cdot]$$

where $S_0(\omega)$ is the spectrum of the audio signal from the source, $R(\omega, \vec{r}_i, \vec{r}_k)$ is the AMM channel radiation pattern which is mostly determined by the shape of the channel, aperture, and $$G(\omega, \vec{r}_i, \vec{r}_k = \begin{matrix}\vec{r}_i, -\vec{r}_k \\ \vec{r}_i, -\vec{r}_k \\ e^{-jk\|l\|}\end{matrix}$$

is the Green's function from the location $\vec{r}_i$ of the aperture of the $i^{th}$ channel to the location $\vec{r}_k$. The coefficient $a(\omega)$ includes all other factors such as sensor and speaker responses that are uniform for different source locations and audio signals.

Each column of the measurement matrix $$H = \begin{bmatrix} h_{11} h_{12} & \dots & h_{1N} \\ \vdots & \ddots & \vdots \\ h_{M1} h_{M2} & \dots & h_{MN} \end{bmatrix}$$

represents the discretized Fourier components of source emitting the music signal from one of the speakers on the recording stage. The number of columns of the matrix is N=K×P, where K is the possible speaker locations on the stage and P is the size of the audio segments.

Each row $H_{mn}$ of the measurement matrix (i.e., H) represents a test function for the object vector at one frequency, because a measurement value in the measurement data vector is sampled in the way defined by the test function as $g_m = f$, $H_m$>, where the angle bracket denotes the inner product. The randomization of the measurement matrix for the AMM acoustic sensing system is contributed by the carefully designed AMM channel responses $T_i(\omega)$.

An element in the measurement matrix may be expressed as:

$$G(\omega_m, \vec{r}_i, \vec{r}_k)T_i(\omega_m)R(\omega_m, \vec{r}_i, \vec{r}_k)$$

$$h_{mn} = P_c(\omega_m, \vec{r}_k, S_p) = a(\omega_m)S_p(\omega_m)\sum_{i=1}^{q}[\cdot]$$

Thus $P_c(\omega, \vec{r}_k, S_p)$ represents frequency spectra (amplitude and frequency content) of the sources, each at different ($\vec{r}_k$, location, and can be determined through $h_{mn}$.

A problem now arises of how to effectively recover the original signal from the compressed data, an is solved by the present technology. Basis pursuit (BP) is a popular mathematical optimization problem which is based on constrained l1 norm minimization, and the split Bregman method is an effective technique for solving a variety of L1-regularized optimization problems. Several reconstruction algorithms based on constrained Lp norm minimization with p<1 have also been proposed. Furthermore, a signal reconstruction algorithm based on the optimization of a smoothed approximate L0 norm (SL0) is studied in where simulation results are compared with corresponding results obtained from several existing algorithms. The results favor the use of the approximate L0 norm.

The Two-Step Iterative Shrinkage Thresholding (TwIST) is an algorithm that provides solutions to inverse linear problems. The TwIST algorithm is known in the art and described, at the time is writing, for example at http://www.lx.it.pt/~biocas/TwIST/TwIST.htm which is quoted here in full:

Many approaches to linear inverse problems define a solution (e.g., a restored image) as a minimizer of the objective function where y is the observed data, K is the (linear) direct operator, and F(x) is a regularizer. The intuitive meaning of f is simple: minimizing it corresponds to looking for a compromise between the lack of fitness of a candidate estimate x to the observed data, which is measured by ∥y−Kx∥2, and its degree of undesirability, given by F(x). The so-called regularization parameter 1 controls the relative weight of the two terms.

State-of-the-art regularizers are non-quadratic and non-smooth; the total variation and the lp norm are two well known examples of such regularizers with applications in many statistical inference and signal/image processing problems, namely in deconvolution, MRI reconstruction, wavelet-based deconvolution, Basis Pursuit, Least Absolute Shrinkage and Selection Operator (LASSO), and Compressed Sensing.

Iterative shrinkage/thresholding (IST) algorithms have been recently proposed to the minimization of f, with F(x) a non-quadratic, maybe non-smooth regularizers. It happens that the convergence rate of IST algorithms depends heavily on the linear observation operator, becoming very slow when it is ill-conditioned or ill-posed. Two-step iterative shrinkage/thresholding TwIST algorithms overcome this shortcoming by implementing a nonlinear two-step (also known as "second order") iterative version of IST. The resulting algorithms exhibit a much faster convergence rate than IST for ill conditioned and ill-posed problems.

An inverse problem in science is the process of calculating from a set of observations the causal factors that produced them. TwIST has been used to solve many image restoration and compressed sensing problems. The recent approach for restoration of images is the use of wavelets in a two step process, the TwIST. The two steps, in TwIST are Iterative Shrinkage and Thresholding. TwIST algorithm produces faster convergence compared to conventional IST algorithms even for ill conditioned problems.

The two-step iterative shrinkage-thresholding (TwIST) algorithm based on a second-order approach is used to improve convergence performance. In an iterative optimization process based on a Fourier space, the TwIST algorithm shows a convergence rate better than that of other first-order methods. When compared to other Iterative Shrinkage/Thresholding (IST) algorithms TwIST is more effective since its convergence is based on both past and present iterations. The iterative shrinkage-thresholding (IST) algorithm is derived from a consideration of the L1-norm of the proximal gradient method and is now a common tool for image recovery—one that is based on the principle of CS. A soft-thresholding filtering algorithm using a pseudo-inverse of a discrete difference transform demonstrates a good image recovery.

The TwIST algorithm can be used, in step 210, to handle highly ill posed de-noising problems. In an inverse problem, the goal is to estimate an unknown original signal/image x from a (possibly noisy) observation y, produced by an operator K applied to x. For the linear system of ill-conditioned problems $$y=Kx$$

where, for different values of x the image is observed.

In TwIST, the approach is to solve the minimization problem:

$$f(x)½||y−Ax||^2+\lambda\phi(x),$$

where $\lambda$ is a constant weight factor, N is the noise vector, y is the measurement, and A is the system matrix, $\phi$ is a regularization function, and ½ is an energy matching coefficient.

Many approaches to linear inverse problems define a solution (e.g., a restored image) as a minimizer of the objective function $$f(x)=½||y−Kx||^2+\lambda\phi(x),$$

where y is the observed data, K is the (linear) direct operator, and F(x) is a regularizer. The intuitive meaning of f is simple: minimizing it corresponds to looking for a compromise between the lack of fitness of a candidate estimate x to the observed data, which is measured by $||y−Kx||2$, and its degree of undesirability, given by F(x). The so-called regularization parameter 1 controls the relative weight of the two terms. Two-step iterative shrinkage/thresholding TwIST algorithms by implements a nonlinear two-step (also known as "second order") iterative version of IST. The resulting algorithms exhibit a much faster convergence rate than IST for ill conditioned and ill-posed problems.

The TwIST method aims at keeping the good de-noising performance of the IST scheme, while still being able to handle ill-posed problems as efficiently as the IST algorithm. In this method a new class of iterative methods, called TwIST, which have the form of Two-step Iterative Shrinkage/Thresholding (TwIST) algorithms has been used. The update equation depends on the two previous estimates (thus, the term two-step), rather than only on the previous one. This class contains and extends the Iterative Shrinkage/Thresholding (IST) methods.

The sensing system of the present technology has randomized placement (or pseudo-randomized placement) of Helmholtz resonators with a general sampling model as g=Hf, where g is the vector form of the measured data (measurement vector); f is the object vector to be estimated. The measurement matrix H, which represents the forward model of the sensing system, is formed by stacking rows of linear sampling vectors [also known as test functions] at sequentially indexed frequencies. This matrix is randomized by the physical properties of the meta materials to generate highly uncorrelated information channels for sound wave from different azimuths and ranges. The level of randomization of the matrix determines the supported resolution and the multiplexing capability of the sensing system.

Now referring to the A multi-speaker system provides acoustic signals being played through several speakers on the stage. A Fourier component of the collected signal can be expressed as the superposition of the responses from all of the waveguides at this frequency:

$$F_i(\omega)$$
$$i$$

$$F_c(\omega) = \sum_i^N []$$

is the response from the $i^{th}$ AMM channel.

The measured data vector to be used for reconstruction is g=[

$$F_c(\omega_1)F_c(\omega_2) \dots F_c(\omega_M),$$
$$[]^T$$

and the object vector f is a scalar vector containing N=K×P elements (K is the number of the possible locations and P is the size of the finite audio library). Because of the sparsity of f (only several elements are nonzero, corresponding to the activated sources), the sensing process is an ideal fit for the framework of compressive sensing. L1-norm regularization is performed with the Two-step Iterative Shrinkage/Thresholding (TwIST) algorithm to solve the ill-posed inverse problem.

In an inverse problem, the goal is to estimate an unknown original signal/image x from a possibly noisy observation y, produced by an operator K applied to x. For the linear system of ill-conditioned problems $$y=Kx$$

Where, for different values of x the image is observed.

Now, in step 210 (still referring to FIG. 9), from the TwIST method for linear system, a linear function Ax=B is considered where the matrix A is split to C and R given below (in step 230):

$$A=C−R,$$

Taking C=I+$\lambda$Dt and R=I−KTK in the above equation (step 240)

$$A=\lambda Dt+KTK,$$

The two-step iteration for linear system Ax=B becomes (step 250)

$$Xt+1=(1−\alpha)xt−1+(\alpha−\beta)xt−1+(1−\gamma)xt+\beta\Gamma\lambda(xt)A=\lambda Dt+KTK,$$

The process of TwIST is performed (step 260):

$$X1=\Gamma\lambda(x0)$$

$$Xt+1=(1−\alpha)xt−1+(\alpha−\beta)xt+\beta\Gamma\lambda(xt)$$

The different values of α and β are set as follows (step 270):

$$\alpha = \rho 2 + 1,$$

$$\beta = 2\alpha/(\xi m + \xi 1)$$

where the value of p is given as (step 280):

$$Q = (1-\sqrt{k})/(1+\sqrt{k}) < 1$$

If convergence (step 290) is proved the iteration is stopped (step 295), otherwise the process is reiterative and steps 260-290 are carried out again.

The non-resonant acoustic meta material (AMM) impedance system using micro-perforated panels (MPP) periodically arranged within porous layers and air gaps used in embodiments of the disclosed technology layered device are optimized for acoustic impedance in addition to sound absorption. Traditional micro-perforates are tuned to certain frequencies, as done for Helmholtz resonators, whereas in the present technology, AMM devices are tuned over a frequency range of 20-20000 Hz. In embodiments of the disclosed technology, non-resonant acoustic meta material layers which utilizes periodic arrangement of meta material MPP sheets and sound absorptive layers as well as air gaps are used. The thickness and material properties of absorptive layers and design parameters of micro-perforated sheets, such as hole diameter, hole spacing etc., are optimized using the meta material approach [Ref]. The AMM impedance matching is essentially frequency independent and may be tailored by the geometry of the acoustic meta material speaker system.

Figure 5:
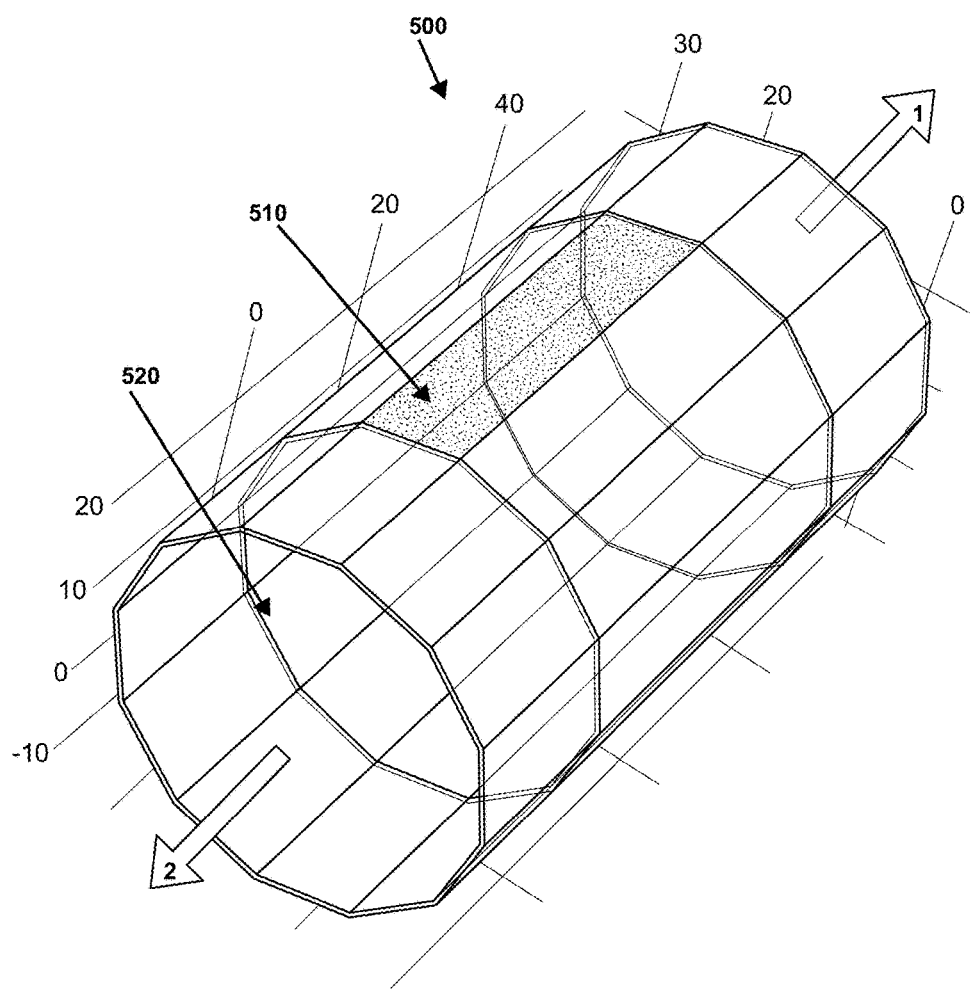
FIG. 5 shows a playback device used to exhibit holographic sound recorded using embodiments of the disclosed technology.

Now discussing FIG. 5, FIG. 5 shows a playback device used to exhibit holographic sound recorded using embodiments of the disclosed technology. Relative size is shown in the non-bolded numerals, such a in millimeters. In this high level drawing of a polyhedral speaker 500 (as shown, 10-sided) piezoelectric actuators 510 (a single one is shown, but each section/side of the polyhedron has same in embodiments of the disclosed technology) reproduce an acoustic hologram. Multiple piezoelectric actuators may be bonded to the surfaces of the polyhedron speaker. In another embodiment, multiple conventional loudspeakers can are used to reproduce an acoustic hologram. The speakers must be arranged in three dimensions around a center point, the center point equivalent to the position of the microphone 390 used to record the holographic sound. The reproduction functions by way of exhibiting the sound at the direction (three dimensional vector in space relative to the recording point) from the center point from where the sound emanated. In this manner, the sound is reproduced and exits, in the example of the polyhedral speaker 500, in directions 1 and 2 transverse to the direction of sound propagation from the resonator plates 510. The resonators 510 can be acoustic meta-materials vibrated by, and amplifying the sound from, piezoelectric transducers. One such sound playback device 500 or set of speakers can be used for each recorded holographic sound, such as one for a left ear and one for a right ear.

Figure 8:
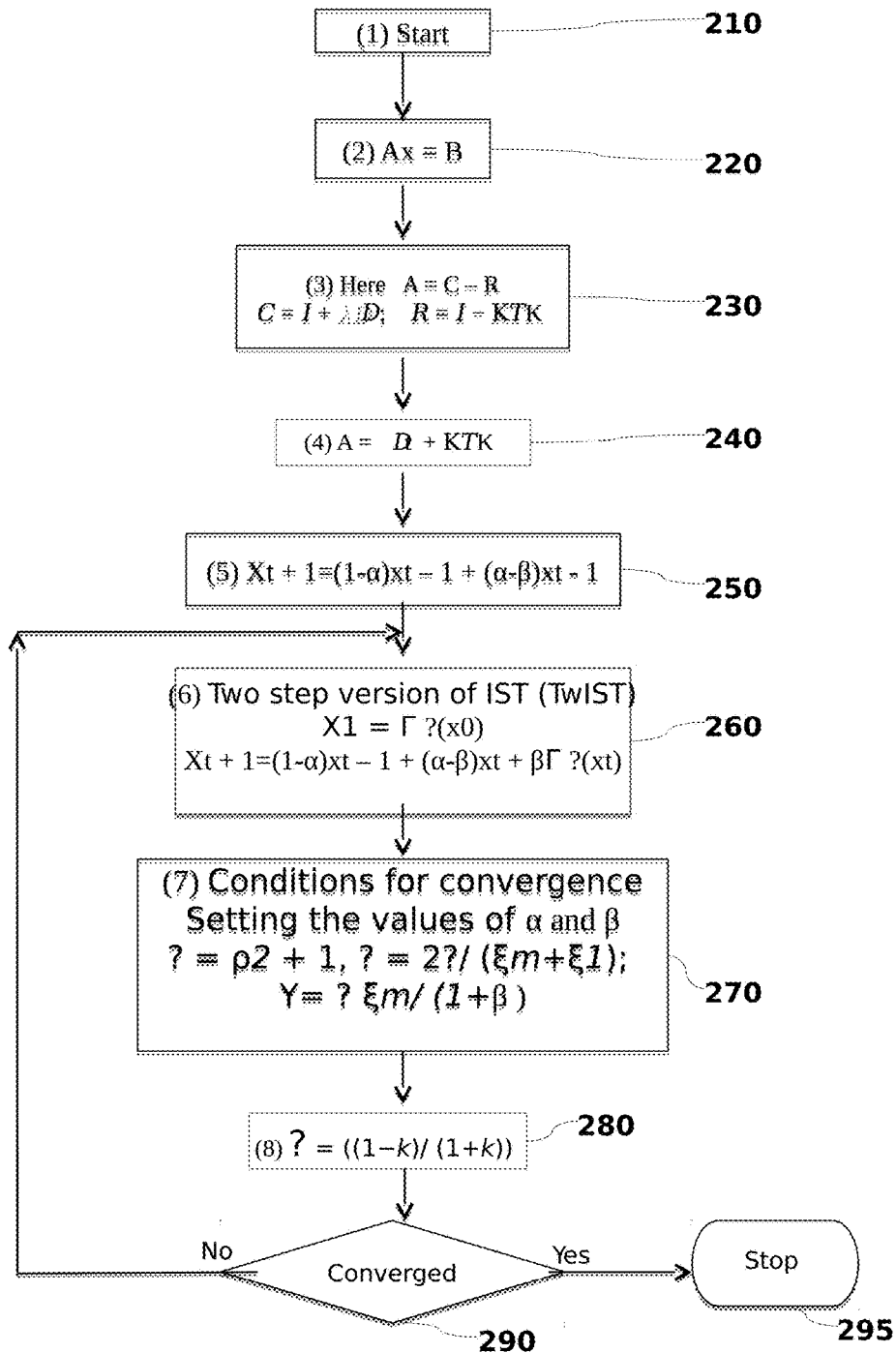
FIG. 8 shows a high level flow chart of steps taking to carry out methods of the disclosed technology.

FIG. 8 shows a high level flow chart of steps taking to carry out methods of the disclosed technology. In step 110, acoustic resonators are arranged into discrete (individual and separated) channels in a pseudo-random circular arrangement. A microphone, such as a monaural omni-directional microphone placed in front of or at the end of the acoustic resonators of the recording device and centered there-between each of, a plurality of, some of, or most of the circular cross sections of the acoustic resonators of the recording device. Output sound from two or more sources or points in three dimensional space (meaning, having different distances from the microphone in at least one, two, or three distances on an X, Y, and Z coordinate plane) is created in step 120. The output sound from the ambient space around the recording device causes the resonators to resonate. Each is tuned to a specific frequency such as at 1 Hz, 2 Hz, 5 Hz, or 20 Hz difference from another, but pseduo-randomly arranged within the circular arrangement and/or within the discreet channels. This sound is then picked up by the microphone after being reflected off of the resonators in addition to being picked up by the microphone directly without the reflection, in some embodiments. Based on the time difference between the sound hitting the microphone directly and being reflected off of the resonator for a particular frequency, and knowing how far the resonator is from the microphone, one can calculate, as above, the direction of the source of the sound, at least partially. By combining this with the myriad of other frequencies, latency, and position of the resonator for the particular sound, one then calculates, in step 340 the phase shift of the sound waves to enough of a degree to determine the position of each sound relative to the microphone.

The received sound into the microphone is then compressed and stored in a single channel (monaural sound recording) of output from the circular arrangement (recording device) in step 160. Two recording devices can be used in order to create a stereo recording, and as such, one monaural channel is created from each recording device. The recording devices are then, in this embodiment, duplicative such that there are two circular arrangements with discrete channels and with their own monaural microphone, the output of which are each recording into a single monaural recording (step 160). Together, this forms a stereo recording.

Steps 170 and 180 are the steps taken for playback. Playback can be in real-time (as soon as allowed by the processors, networked devices, and transmission devices between the recording device and playback device) or at a later time from the recording. To do so, in step 170, piezo-drivers or speakers are arranged equidistant or substantially equidistant from a center point for each channel. Sound is then played back through specific piezo-drivers, in step 180, based on the previously determined phase shift as stored within each or the sole monaural channel.

Figure 6:
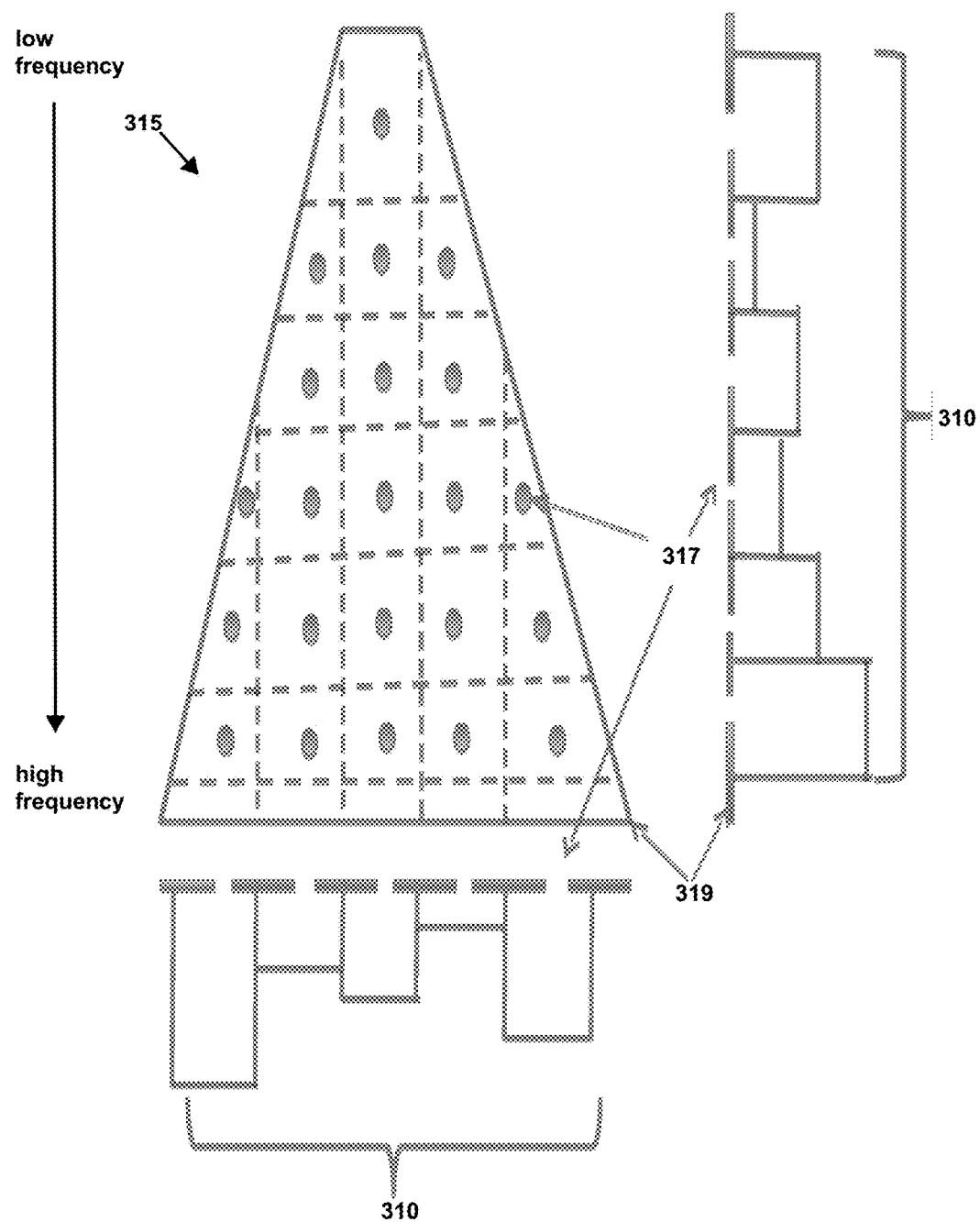
FIG. 6 shows a first schematic representation of a recording device of embodiments of the disclosed technology.
Figure 7:
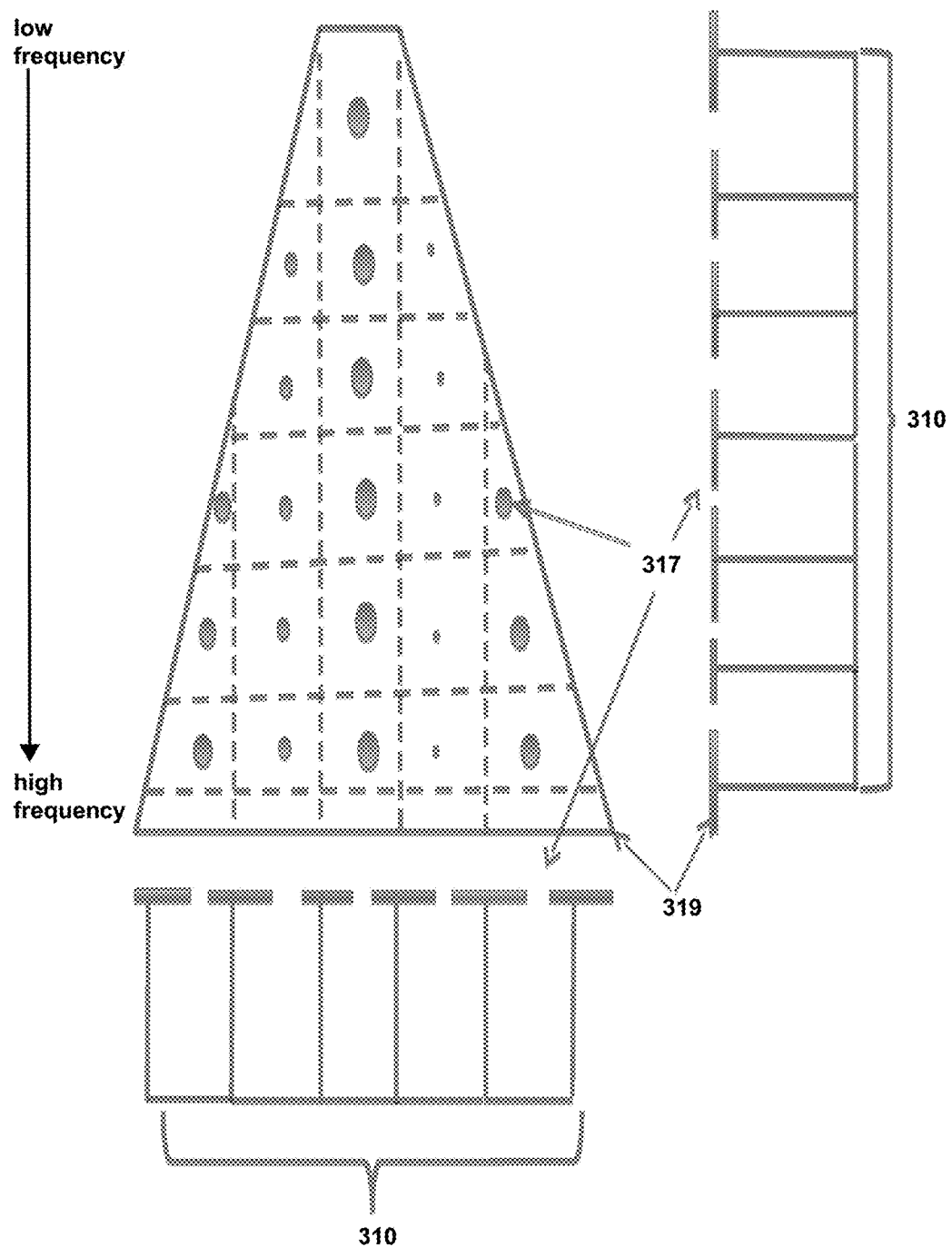
FIG. 7 shows a second schematic representation of a recording device of embodiments of the disclosed technology.

Referring back to FIGS. 6 and 7, schematic representations of recording devices of embodiments of the disclosed technology are shown. FIG. 6 shows a first schematic representation of a recording device of embodiments of the disclosed technology. FIG. 7 shows a second schematic representation of a recording device of embodiments of the disclosed technology. The top of the page has lower frequencies while the bottom of the page has higher frequencies. As this is a section/wedge of the circle (see FIG. 1), one is looking at a cross-section of the circle with lower frequencies requiring larger resonators, while higher frequencies require smaller resonators and are typically more towards the outside of the circle. Each insulative layer 315 on the outer side and a face plate 319, having a plurality of holes 317 through which sound passes in to the sub-wavelength resonators on the inner side of the recording device in embodiments of the disclosed technology. Flipped 90 degrees, one can see the depth of the resonators 310 in the smaller figures to the right and below the cross section.

Figure 10:
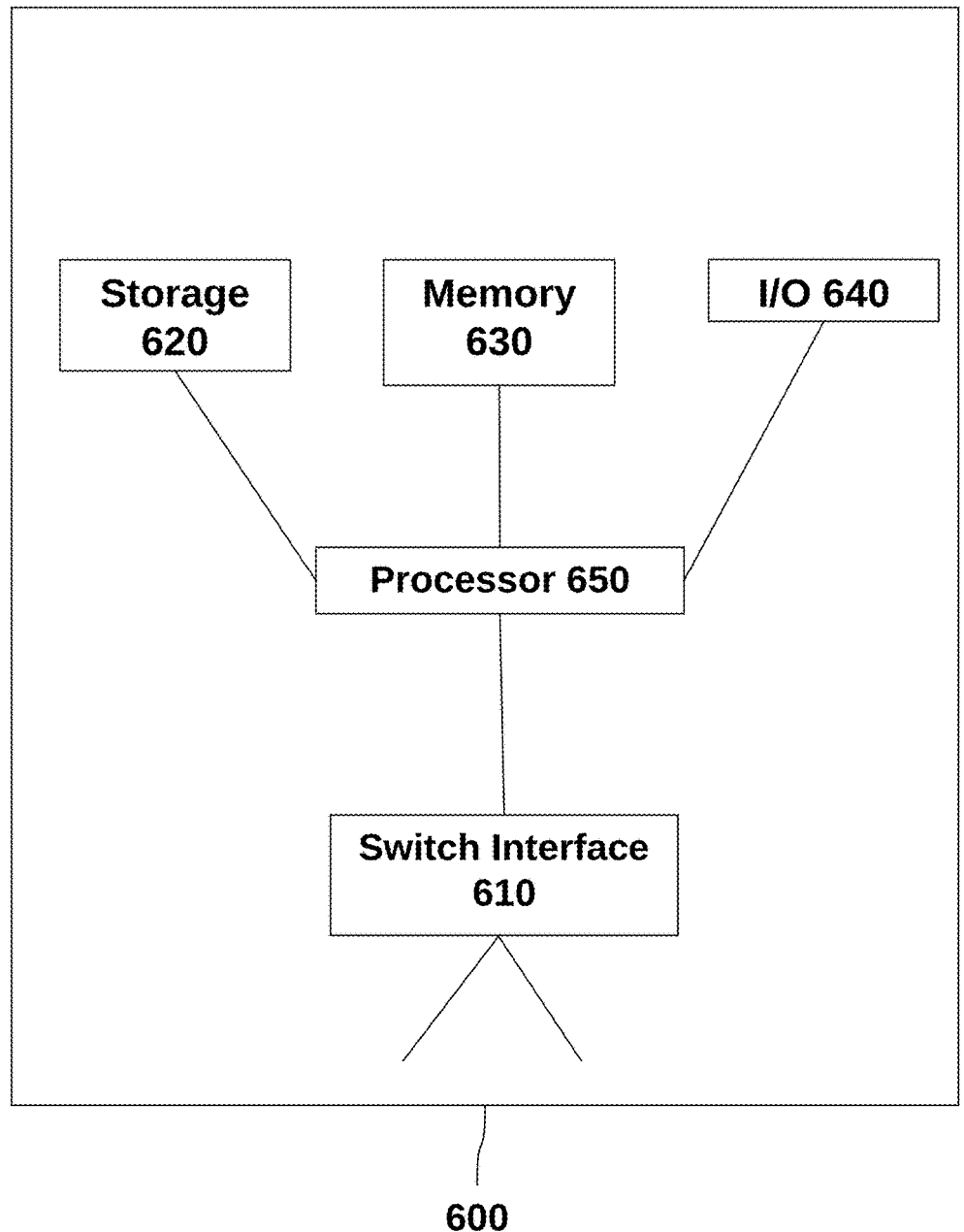
FIG. 10 is a high level block diagram showing devices on which embodiments of the disclosed technology may be carried out.

FIG. 10 shows a high-level block diagram of a device that may be used to carry out the disclosed technology. Device 600 comprises a processor 650 that controls the overall operation of the computer by executing the device's program instructions which define such operation. The device's program instructions may be stored in a storage device 620 (e.g., magnetic disk, database) and loaded into memory 630, when execution of the console's program instructions is desired. Thus, the device's operation will be defined by the device's program instructions stored in memory 630 and/or storage 620, and the console will be controlled by processor 650 executing the console's program instructions. A device 600 also includes one, or a plurality of, input network interfaces for communicating with other devices via a network (e.g., the Internet). The device 600 further includes an electrical input interface. A device 600 also includes one or more output network interfaces 610 for communicating with other devices. Device 600 also includes input/output 640, representing devices which allow for user interaction with a computer (e.g., display, keyboard, mouse, speakers, buttons, etc.). One skilled in the art will recognize that an implementation of an actual device will contain other components as well, and that FIG. 4 is a high level representation of some of the components of such a device, for illustrative purposes. It should also be understood by one skilled in the art that the method and devices depicted in FIGS. 1 through 9 may be implemented on a device such as is shown in FIG. 10.

Further, it should be understood that all subject matter disclosed herein is directed, and should be read, only on statutory, non-abstract subject matter. All terminology should be read to include only the portions of the definitions which may be claimed. By way of example, "computer readable storage medium" is understood to be defined as only non-transitory storage media.

While the disclosed technology has been taught with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A method of recording and reproducing sound in three dimensions, comprising the steps of: receiving, sound into a microphone after being reflected or refracted off a plurality of resonators arranged into discrete channels; storing said sound outputted from said microphone after applying a digital compression technique to said sound; based, at least in part, on a distance between each of said discrete channels to said microphone and a determined phase shift of at least some frequencies within said sound, vibrating a plurality of piezo-drivers which send vibrations through acoustic meta material in a manner which at least partially recreates directionality of said sound reflected or refracted off said plurality of resonators; wherein said plurality of piezo-drivers are equi-spaced around a center point on a polyhedral sound reproduction device, each piezo-driver of said plurality of piezopeize-drivers attached to or being a surface of said sound sound reproduction device in manner lacking correspondence with placement of said plurality of resonators.

2. The method of claim 1, wherein said microphone is monaural and omni-directional and calibrated to receive sound substantially equally from each said discrete channel.

3. The method of claim 2, wherein each resonator resonates at a different frequency than each other resonator and are pseudo-randomly arranged in separate channels in a circular arrangement in front of a sound input end of said microphone.

4. The method of claim 3, wherein said pseudo-randomly arranged said resonators arranged in said discrete channels in a circular manner, said discrete channels being separated from one another by non-resonant material there-between each two channels of said discrete channels.

5. The method of claim 1, wherein further based on said distance between each said discrete channel and said microphone and said determined phase shift, determining a direction from which said sound emanated before causing said plurality of piezo-drivers to vibrate said acoustic metamaterial.

6. The method of claim 1, wherein said plurality of piezo-drivers are each attached to a single sound reproduction device which amplifies sound waves emanating from said plurality of piezo-drivers.

7. A method of recording and creating holographic sound, comprising the steps of: receiving, into two microphones, sound reflected or refracted off a plurality of resonators; each said plurality corresponding to one of said two microphones; for each of said two microphones, and storing said output after applying a digital compression technique to said output to obtain acoustic holographic data associated with said sound-; based, at least in part, on a distance between each resonator of said plurality of resonators to a corresponding said one of said microphones and a determined phase shift of at least some frequencies within said output for said corresponding said microphone, vibrating a plurality of flat-surfaced piezodrivers mounted on a sound reproduction device, each facing in a different direction around a center point in a manner which at least partially recreates directionality of said sound reflected off said plurality of resonators in a manner which a position and direction of said sound being recreated is detectable.

8. The method of claim 7, wherein each said microphone is monaural and omni-directional and calibrated to receive sound substantially equally from each resonator of said plurality of resonators corresponding to a respective said microphone of said two microphones.

9. The method of claim 7, wherein said plurality of piezo-drivers include a first set of piezo-drivers equi-spaced from a center point and a second set of piezo-drivers equi-spaced from a second center point on said sound reproduction device and each said first set and said second set outputs recreated sound from a different one of said two microphones.

* * * * *